United States Patent
Kobayashi et al.

(10) Patent No.: US 10,590,004 B2
(45) Date of Patent: Mar. 17, 2020

(54) POROUS CERAMIC PARTICLES

(71) Applicant: NGK Insulators, Ltd., Nagoya (JP)

(72) Inventors: Hiroharu Kobayashi, Kasugai (JP); Takahiro Tomita, Chita (JP); Akinobu Oribe, Kakamigahara (JP)

(73) Assignee: NGK Insulators, Ltd., Nagoya (JP)

( * ) Notice: Subject to any disclaimer, the term of this patent is extended or adjusted under 35 U.S.C. 154(b) by 21 days.

(21) Appl. No.: 15/869,506

(22) Filed: Jan. 12, 2018

(65) Prior Publication Data

US 2018/0134574 A1    May 17, 2018

Related U.S. Application Data

(63) Continuation of application No. PCT/JP2016/066504, filed on Jun. 2, 2016.

(30) Foreign Application Priority Data

Jul. 16, 2015 (JP) .................. 2015-141895
Dec. 2, 2015 (JP) .................. 2015-235494

(51) Int. Cl.
 *C01G 25/02* (2006.01)
 *C04B 38/00* (2006.01)

(52) U.S. Cl.
 CPC .............. *C01G 25/02* (2013.01); *C04B 38/00* (2013.01); *C04B 2201/32* (2013.01)

(58) Field of Classification Search
 None
 See application file for complete search history.

(56) References Cited

U.S. PATENT DOCUMENTS

| | | | |
|---|---|---|---|
| 5,618,765 A * | 4/1997 | Takeuchi | B01D 39/2075 501/152 |
| 6,057,030 A * | 5/2000 | Mano | C04B 38/067 264/44 |
| 2009/0214850 A1* | 8/2009 | Hara | C04B 35/565 428/314.2 |
| 2012/0009412 A1 | 1/2012 | Iwai et al. | |
| 2015/0104626 A1* | 4/2015 | Tomita | C09D 1/00 428/213 |

FOREIGN PATENT DOCUMENTS

| | | | |
|---|---|---|---|
| JP | 2004-010903 A1 | 1/2004 |
| JP | 2006-173368 A | 6/2006 |
| JP | 2010-064945 A1 | 3/2010 |
| JP | 2010-155946 A1 | 7/2010 |

OTHER PUBLICATIONS

English Abstract of Fujii et al. (JP 2005-001943) (Year: 2005).*
English Abstract of Nishio et al. (JP 2003-088578) (Year: 2003).*
International Search Report and Written Opinion (Application No. PCT/JP2016/066504) dated Jul. 19, 2016.
German Office Action (with English translation), German Application No. 11 2016 003 208.0, dated Jan. 22, 2019 (7 pages).

* cited by examiner

*Primary Examiner* — Ronak C Patel
(74) *Attorney, Agent, or Firm* — Burr & Brown, PLLC

(57) ABSTRACT

A porous ceramic particle has a porosity of 20% to 99%, and one principal surface of the porous ceramic particle is a mirror surface, and an aspect ratio thereof is greater than or equal to 3.

16 Claims, 10 Drawing Sheets

POROUS CERAMIC PARTICLES

CROSS-REFERENCE TO RELATED APPLICATIONS

This application is a Continuation of International Application No. PCT/JP2016/066504 filed on Jun. 2, 2016, which is based upon and claims the benefit of priority from Japanese Patent Applications No. 2015-141895 filed on Jul. 16, 2015 and No. 2015-235494 filed on Dec. 2, 2015, the contents all of which are incorporated herein by reference.

BACKGROUND OF THE INVENTION

Field of the Invention

The present invention relates to porous ceramic particles, and more particularly relates to porous ceramic particles suitable for achieving a reduction in the thermal conductivity of a component material containing the porous ceramic particles.

Background Art

As a filler that is filled in a heat insulating material or a film, compositions and hollow particles and the like have been described in Japanese Laid-Open Patent Publication No. 2010-155946, Japanese Laid-Open Patent Publication No. 2004-010903, and Japanese Laid-Open Patent Publication No. 2010-064945.

Japanese Laid-Open Patent Publication No. 2010-155946 describes a curable organopolysiloxane composition, which is capable of forming a porous organopolysiloxane cured product having low thermal conductivity.

Japanese Laid-Open Patent Publication No. 2004-010903 describes the formation of a film having low thermal conductivity, by using a coating material in which hollow particles with low thermal conductivity are used.

Japanese Laid-Open Patent Publication No. 2010-064945 discloses a method in which additive particles are adsorbed on surfaces of base particles by an electrostatic interaction, thereby producing nanocoated composite particles, and further manufacturing a composite material through an ordinary powder metallurgy process by use of the composite particles.

SUMMARY OF THE INVENTION

With the technology described in Japanese Laid-Open Patent Publication No. 2010-155946 and Japanese Laid-Open Patent Publication No. 2004-010903, the reduction in thermal conductivity is insufficient. With the technology described in Japanese Laid-Open Patent Publication No. 2010-064945, since it is intended to manufacture a composite material by powder metallurgy, it is kept in mind that fine particles with a particle diameter on the order of nanometers (nm) are coated on the base particles. Therefore, the distance between the base particles becomes short, and further, it is difficult for pores to be formed when subjected to sintering, and even if formed, only a small amount of pores are formed. Therefore, in this case as well, the reduction in thermal conductivity is insufficient.

If the particles added to the adhesive are small, it is difficult to uniformly disperse the particles in the adhesive. Further, since it is necessary to fire an adhesive to which particles have been added in advance to form a bulk body, for example, and since it is necessary to place the adhesive on a base material (an object to which the bulk body is adhered), it becomes difficult to place the bulk body in a partial area of the object, and it is difficult to place the bulk body along a complex shape.

The present invention has been made in consideration of the aforementioned problems, and has the object of providing porous ceramic particles, with which it is possible to achieve low thermal conductivity, together with installing the porous ceramic particles directly on an object using an adhesive or the like, and further, with which it is possible to facilitate installation of a bulk body.

[1] A porous ceramic particle according to the present invention is characterized by having a porosity of 20% to 99%, and wherein one principal surface of the porous ceramic particle is a mirror surface, and an aspect ratio thereof is greater than or equal to 3.

[2] In the present invention, another principal surface that faces toward the one principal surface may also be a mirror surface.

[3] In the present invention, the porous ceramic particle has a plurality of side surfaces, and the side surfaces preferably are rough surfaces.

[4] In the present invention, a minimum length of an outer shape of the porous ceramic particle preferably is 50 to 500 µm.

[5] In the present invention, an average pore diameter of the porous ceramic particle preferably is less than or equal to 500 nm.

[6] In the present invention, a thermal conductivity of the porous ceramic particle preferably is less than or equal to 1 W/mK.

[7] In the present invention, preferably, the porous ceramic particle has a structure in which fine grains are connected in three dimensions, and a grain diameter of the fine grains is 1 nm to 5 µm.

[8] In the present invention, an inter-particle distance preferably is less than or equal to 10 µm.

[9] The porous ceramic particle according to the present invention may be disposed on a sheet.

In accordance with the porous ceramic particle according to the present invention, it is possible to achieve a low thermal conductivity, together with installing the porous ceramic particle directly on an object using an adhesive or the like, and further, it is possible to facilitate installation of a bulk body.

DESCRIPTION OF THE PREFERRED EMBODIMENTS

Hereinafter, an exemplary embodiment of porous ceramic particles according to the present invention will be described with reference to FIGS. 1A to 10C. In the present specification, the tilde symbol "~" which indicates a numerical range is used with the implication that the numerical values written before and after the tilde symbol are included therein as a lower limit value and an upper limit value of the numerical range.

Figure 1A:
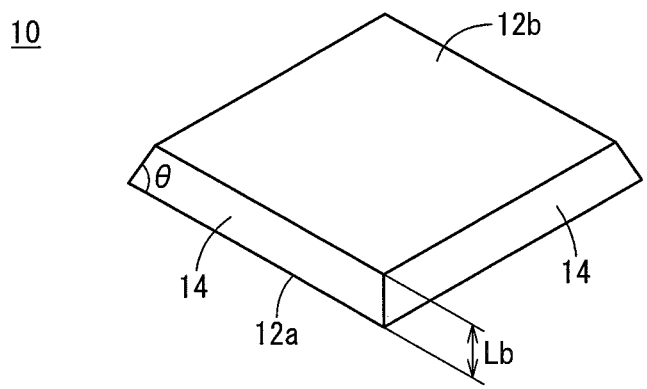
FIG. 1A is a perspective view showing an example in which a porous ceramic particle according to the present embodiment is arranged such that one principal surface thereof faces downward.
Figure 1B:
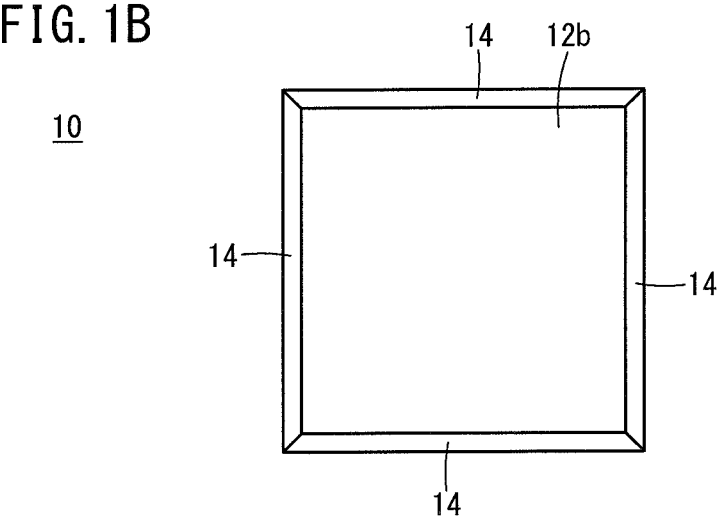
FIG. 1B is a plan view of the porous ceramic particle shown in FIG. 1A as viewed from above.

As shown for example in FIGS. 1A to 10, porous ceramic particles 10 according to the present embodiment are of a three-dimensional shape, each having one principal surface 12a, another principal surface 12b opposite to the one principal surface 12a, and a plurality of side surfaces 14 (for example, four side surfaces 14). The porous ceramic particles 10 may be of a polygonal shape, a disc shape, or the like. FIG. 1A illustrates an example in which the outer shape of the porous ceramic particle 10 is formed in a truncated quadrangular pyramidal shape, and the one principal surface 12a is oriented downward, whereas the other principal surface 12b is oriented upward. The front faces of the one principal surface 12a and the other principal surface 12b may face toward each other mutually, or may face toward each other at an angle to some extent.

In this case, as shown in FIG. 1A, the angle of inclination θ of each of the side surfaces 14 may be the same or different from each other. Of course, the angle of inclination θ of at least one of the side surfaces 14 may differ from the angles of inclination θ of the other side surfaces 14. In this instance, the angles of inclination θ of the side surfaces 14 are defined as angles of inclination with respect to the one principal surface 12a.

Figure 2A:
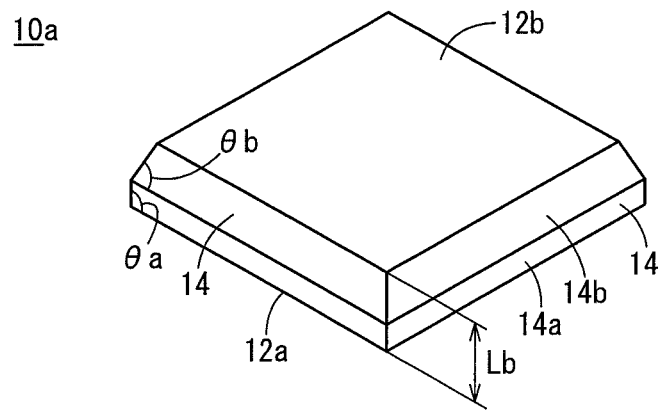
FIG. 2A is a perspective view showing an example in which a porous ceramic particle according to a modified example is arranged such that one principal surface thereof faces downward.

As for the external shape thereof, as in the porous ceramic particle 10a according to the modified example shown in FIG. 2A, the respective side surfaces 14 may be composed of a plurality of surfaces 14a, 14b having different angles of inclination θa and θb.

As for the polygonal shape that makes up the porous ceramic particles 10, 10a, the shape thereof as viewed from above may be a rectangular shape as shown in FIGS. A and 2A, or otherwise, may be a polygonal shape such as a pentagonal shape, a hexagonal shape, an octagonal shape or the like, or a track shape, an elliptical shape, a circular shape, or the like. Moreover, respective ridge line portions of the outer shape may be curved surfaces (surfaces with a radius of curvature R).

Furthermore, preferably, at least the one principal surface 12a of the porous ceramic particles 10, 10a is a mirror surface. In this instance, mirror surface implies a surface having a surface roughness Ra that is less than or equal to 1 μm. The surface roughness Ra of the one principal surface 12a, which is a mirror surface, preferably is smaller than that of the opposing other principal surface 12b. In the case that the one principal surface 12a is a mirror surface, the surface roughness Ra of the opposing other principal surface 12b preferably is large. Of course, it is preferable that the other principal surface 12b, which is opposed to the one principal surface 12a, is also a mirror surface. In the case that the one principal surface 12a and the other principal surface 12b are both mirror surfaces, it is further preferable that the surface roughness Ra of the one principal surface is less than 90% of the surface roughness Ra of the other principal surface. The side surfaces 14 of the porous ceramic particles 10, 10a preferably are rough surfaces. In this instance, rough surface implies a surface having a surface roughness Ra in excess of 1 μm, and preferably, a surface having a surface roughness Ra greater than or equal to 5 μm and less than or equal to 10 μm. Further, in the case that the porous ceramic particles are formed into a film, and more specifically, in the case of forming a bulk body 20 (see FIG. 4B), the one principal surface of each of the porous ceramic particles is disposed on the front surface side when the film is formed, and the other principal surface thereof is disposed on the side of a base material (i.e., an object 26 to which the bulk body 20 is adhered).

Figure 1C:
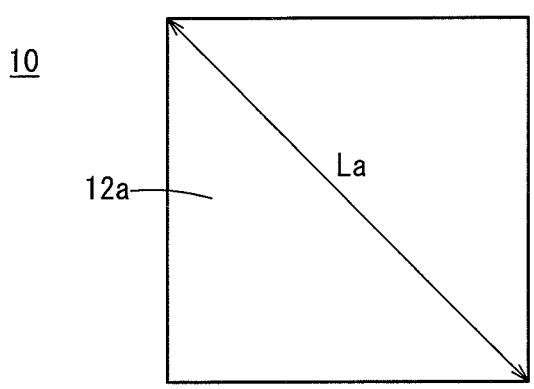
FIG. 1C is a bottom view showing the porous ceramic particle shown in FIG. 1A as viewed from below.
Figure 2B:
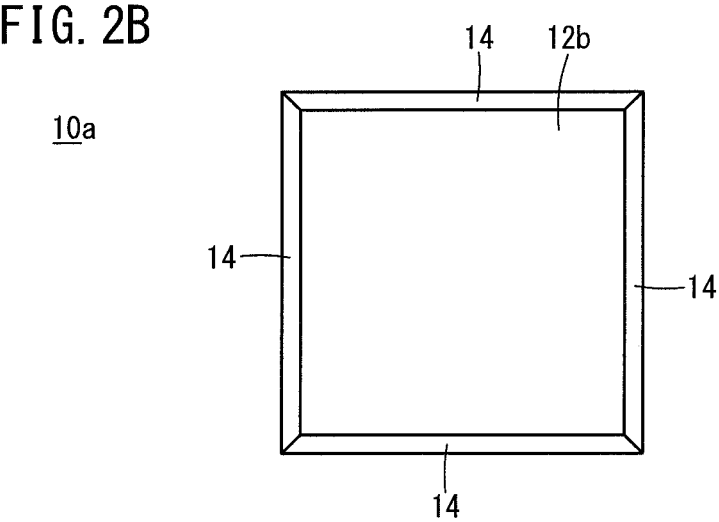
FIG. 2B is a plan view of the porous ceramic particle shown in FIG. 2A as viewed from above.
Figure 2C:
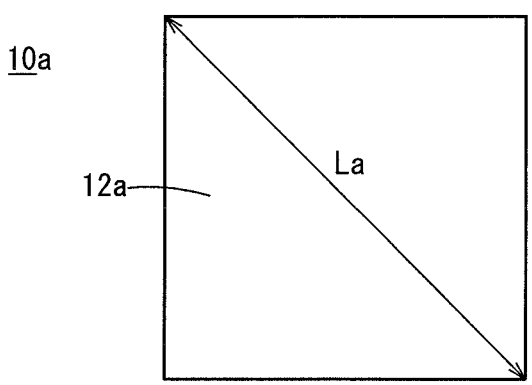
FIG. 2C is a bottom view showing the porous ceramic particle shown in FIG. 2A as viewed from below.

Further, the porous ceramic particles 10, 10a preferably have an aspect ratio greater than or equal to 3. More preferably, the aspect ratio is greater than or equal to 5, and even more preferably, is greater than or equal to 7. In this case, as shown for example in FIGS. 1A, 1C, 2A, and 2C, the aspect ratio refers to a maximum length La divided by a minimum length Lb. In this instance, as shown in FIGS. 1C and 2C, the maximum length La refers to a maximum length on a widest surface (in this case, the one principal surface 12a) from among the plurality of surfaces constituting the porous ceramic particles 10, 10a. Assuming that the widest surface is a square, a rectangle, a trapezoid, a parallelogram, or a polygon (pentagon, hexagon, etc.), the length thereof corresponds to the length of a longest diagonal line, whereas if the widest surface is circular, the length thereof corresponds to the length of a diameter, and if the widest surface is an ellipse, the length thereof corresponds to the length of a major axis of the ellipse. On the other hand, as shown in FIGS. 1A and 2A, the minimum length Lb refers to a thinnest portion from within the thicknesses of the porous ceramic particles 10, 10a.

The minimum length Lb preferably is 50~500 μm, more preferably, is 55~400 μm, even more preferably is 60~300 μm, and particularly preferably, is 70~200 μm.

The term "porous" may refer to a state that is neither dense nor hollow, as well as a state composed of a plurality of pores or grains. Moreover, the "term" dense refers to a state in which a plurality of fine grains are bonded without gaps, having no pores. The term "hollow" refers to a state in which the interior is hollow, and in which an outer shell portion thereof is dense.

The porosity of the porous ceramic particles 10, 10a is 20%~99%. The pores include at least one of closed pores and open pores, and may include both closed pores and open pores. Further, the shape of the pores, i.e., a surface shape of openings thereof, may be of any shape including a square shape, a quadrilateral shape, a triangular shape, a hexagonal shape, a circular shape, etc., or an irregular shape. The average pore diameter preferably is less than or equal to 500 nm, and more preferably, is 10~500 nm. This dimension is effective to inhibit occurrence of lattice vibrations (phonons), which is a primary cause of thermal conductivity.

The porous ceramic particles 10, 10a have a structure in which fine grains are connected in three dimensions. A grain diameter of the fine grains is preferably 1 nm~5 μm. More preferably, the grain diameter is 50 nm~1 μm. The porous ceramic particles 10, 10a, which are composed of fine grains having such a grain size range, effectively achieve a low thermal conductivity, since the occurrence of lattice vibrations (phonons), which is a primary cause of heat conduction, is inhibited. The fine grains may be a grain composed of one crystalline grain (a single crystalline grain), or a grain composed of a large number of crystalline grains (a polycrystalline grain). Stated otherwise, the porous ceramic particles 10, 10a preferably are aggregations of fine grains having grain diameters lying within the aforementioned ranges. The grain diameter of the fine grains is determined by measuring, from an image of an electronic microscopic observation, the size (a diameter in the case of spherical grains, or a maximum diameter otherwise) of one fine grain of the grain groups that make up a framework of the porous ceramic particles 10, 10a.

The thermal conductivity of the porous ceramic particles 10, 10a is preferably less than or equal to 1 W/mK, more preferably, is less than or equal to 0.7 W/mK, even more preferably, is less than or equal to 0.5 W/mK, and particularly preferably, is less than or equal to 0.3 W/mK.

The constituent material of the porous ceramic particles 10, 10a preferably contains a metal oxide, and more preferably, consists only of a metal oxide. This is because, if such a metal oxide is contained therein, the thermal conductivity tends to be lower, due to the fact that the ionic bond between metal and oxygen is stronger compared to the case of a non-oxide (for example, a carbide or nitride) of a metal.

In this case, the metal oxide preferably is an oxide of one element or a composite oxide of two or more elements selected from the group consisting of Zr, Y, Al, Si, Ti, Nb, Sr, La, Hf, Ce, Gd, Sm, Mn, Yb, Er, and Ta. This is because, if the metal oxide is an oxide or a composite oxide of such elements, heat conduction due to lattice vibrations (phonons) is unlikely to occur.

Specific examples of the material include $ZrO_2$—$Y_2O_3$ to which $Gd_2O_3$, $Yb_2O_3$, $Er_2O_3$, etc., is added. As further specific examples thereof, there may be cited $ZrO_2$—$HfO_2$—$Y_2O_3$, $ZrO_2$—$Y_2O_3$—$La_2O_3$, $ZrO_2$—$HfO_2$—$Y_2O_3$—$La_2O_3$, $HfO_2$—$Y_2O_3$, $CeO_2$—$Y_2O_3$, $Gd_2Zr_2O_7$, $Sm_2Zr_2O_7$, $LaMnAl_{11}O_{19}$, $YTa_3O_9$, $Y_{0.7}La_{0.3}Ta_3O_9$, $Y_{1.08}Ta_{2.76}Zr_{0.24}O_9$, $Y_2Ti_2O_7$, $LaTa_3O_9$, $Yb_2Si_2O_7$, $Y_2Si_2O_7$, $Ti_3O_5$, and the like.

A method of manufacturing the porous ceramic particles 10, 10a will now be described with reference to FIGS. 3A and 3B.

Figure 3A:
FIG. 3A is a flowchart showing one example of a method for producing porous ceramic particles.

First, in step S1 of FIG. 3A, a pore forming agent, a binder, a plasticizer, and a solvent are added and mixed with a constituent material powder of the aforementioned porous ceramic particles 10, 10a in order to prepare a casting slurry.

Thereafter, in step S2, the casting slurry is subjected to a vacuum defoaming treatment, whereby the viscosity thereof is adjusted, and thereafter, the cast body (green sheet, green body) is produced, for example, by a doctor blade device.

Thereafter, in step S3, the cast body (green sheet) is fired, and a sheet-shaped sintered body is obtained.

In addition, in step S4, the sintered body is machined with a laser to thereby obtain the porous ceramic particles 10, 10a according to the present embodiment. In such a laser machining process, the sintered body may be separated into a plurality of porous ceramic particles by causing a laser beam to penetrate through the sintered body. In this case, the porous ceramic particles 10 shown in FIGS. 1A to 10 are obtained. Alternatively, the sintered body may be separated into a plurality of porous ceramic particles by bending the sintered body after having caused the laser beam to reach midway through in a thickness direction with respect to the sintered body. In this case, the porous ceramic particles 10a according to the modified example shown in FIGS. 2A to 2C are obtained.

Figure 3B:
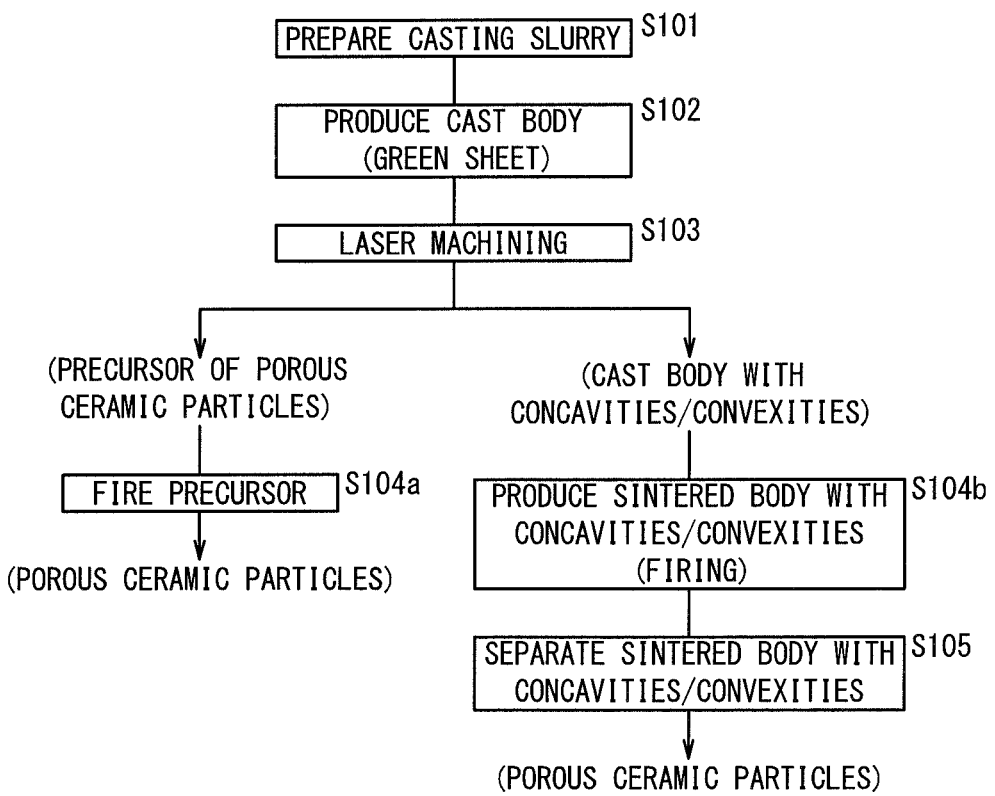
FIG. 3B is a flowchart showing another example of a method for producing porous ceramic particles.

As another manufacturing method, for example as shown in FIG. 3B, in steps S101 and S102, after having prepared a slurry used for casting in the same manner as in steps S1 and S2 of FIG. 3A, a cast body (green sheet) is produced so that the thickness thereof after firing becomes a minimum length.

Thereafter, in step S103, a precursor composed of a plurality of porous ceramic particles, or a cast body (green sheet) having a plurality of concavities and convexities therein is produced by machining the cast body (green sheet) with a laser.

Thereafter, in step S104a, the precursor made up of the plurality of porous ceramic particles is fired to obtain the plurality of porous ceramic particles 10, as shown in FIGS. 1A to 10, for example.

Alternatively, in step S104b, a sintered body having a plurality of concavities and convexities therein is obtained by firing the cast body having the plurality of concavities and convexities. In this case, in the following step S105, the sintered body having a plurality of concavities and convexities therein is separated into the plurality of porous ceramic particles 10a.

Next, two representative methods of constructing a single bulk body 20 using the porous ceramic particles 10 will be described with reference to FIGS. 4A through 10C.

Figure 4A:
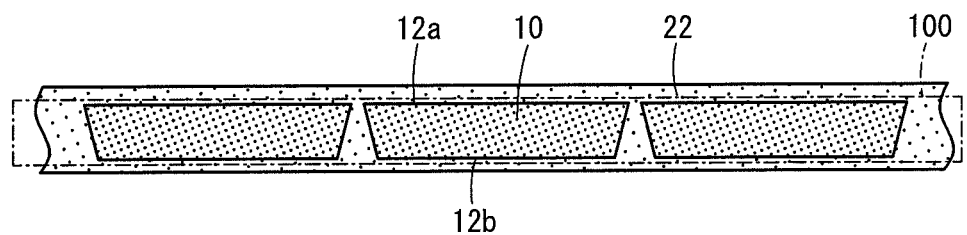
FIG. 4A is a process diagram showing a state in which a plurality of porous ceramic particles and a slurry containing an adhesive component are poured into a non-illustrated mold.
Figure 4B:
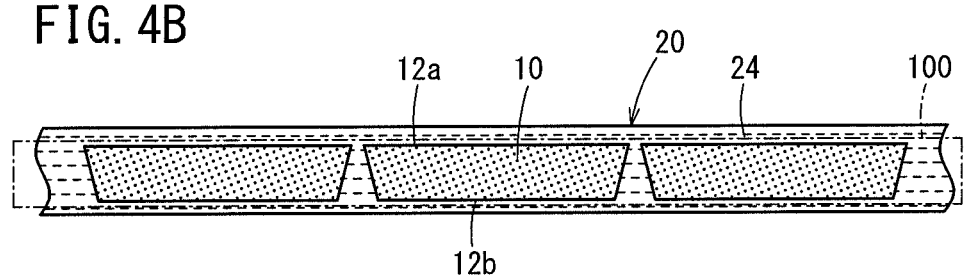
FIG. 4B is a process diagram showing a state in which the slurry is dried, and thereafter fired and solidified to form a bulk body.
Figure 4C:
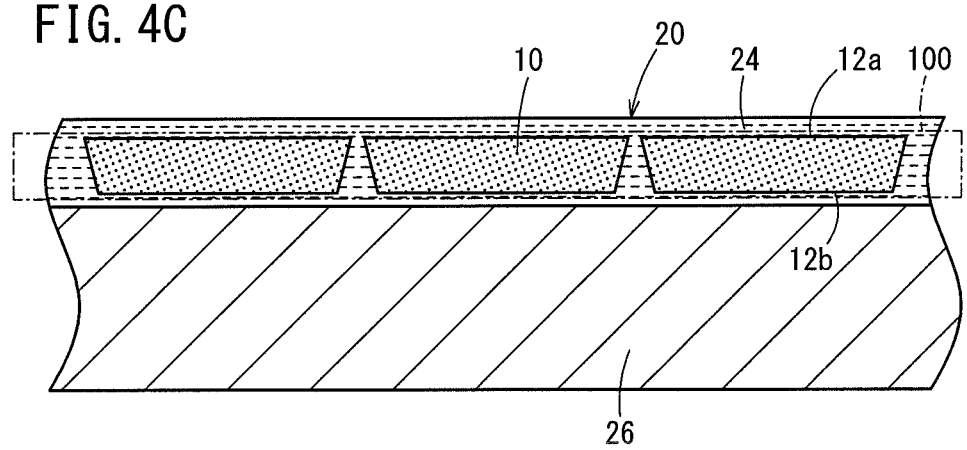
FIG. 4C is a process diagram showing a state in which the bulk body is mounted on a base material (an object to which the bulk body is adhered)

First, in the first method, as shown in FIG. 4A, a plurality of porous ceramic particles 10 and a slurry 22 containing an adhesive component are poured into a non-illustrated mold. At this time, it is possible to uniformly disperse the plurality of porous ceramic particles 10 in the slurry 22. Thereafter, as shown in FIG. 4B, after the slurry 22 has dried, it is fired and solidified in order to prepare the bulk body 20. In the bulk body 20, a state is brought about in which the plurality of porous ceramic particles 10 are uniformly dispersed in an adhesive 24. Thereafter, as shown in FIG. 4C, the bulk body 20 is installed on the object 26 through an adhesive or the like. At this time, for example, the bulk body 20 is placed so that the other principal surface 12b of each of the porous ceramic particles 10 faces toward the object 26.

Figure 5A:
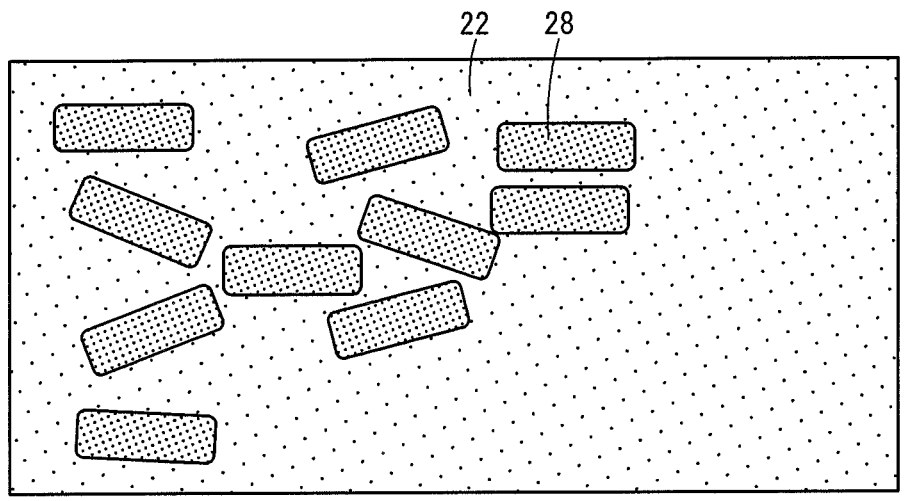
FIG. 5A is an explanatory diagram with partial omission showing a state in which a plurality of particles are dispersed in a slurry according to a conventional example.
Figure 5B:
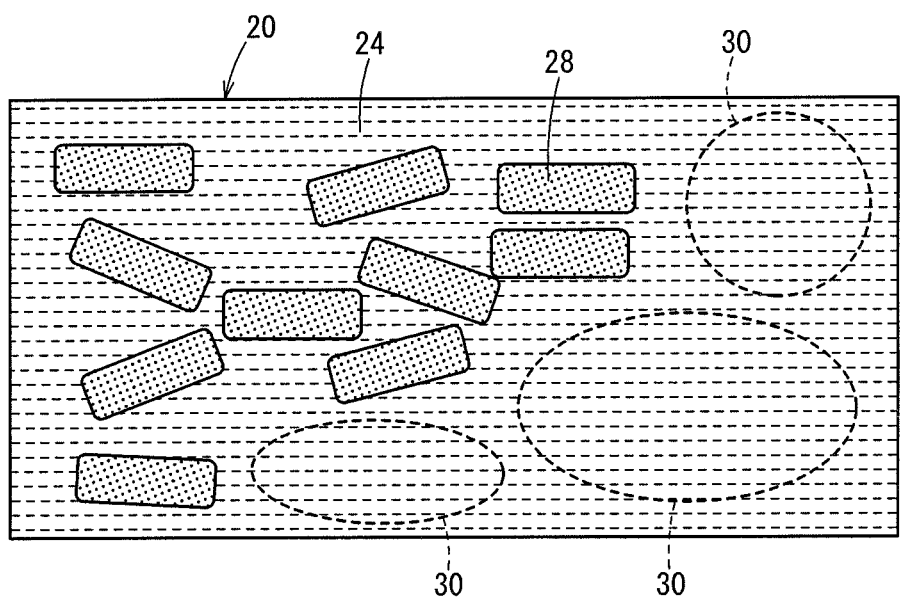
FIG. 5B is an explanatory diagram with partial omission showing a state in which the slurry is solidified to form a bulk body.

Conventionally, as shown in FIG. 5A, since particles 28 added to the slurry 22 are small, it is difficult to uniformly disperse the particles 28 in the slurry 22. Therefore, as shown in FIG. 5B, due to the fact that the plurality of particles 28 are not uniformly dispersed in the adhesive 24 due to solidification of the slurry 22, many regions 30 exist where only the adhesive 24 is present, which has a thermal conductivity higher than that of the particles 28, and thus, the reduction in thermal conductivity of the bulk body 20 is insufficient.

In contrast thereto, according to the present embodiment, due to the fact that the aspect ratio is greater than or equal to 3, as shown in FIGS. 4A through 4C, the plurality of porous ceramic particles 10 can be arranged as a layer and dispersed uniformly. In addition, since the one principal surface 12a of each of the porous ceramic particles 10 is a mirror surface, for example, an unevenness in thickness of the slurry 22 that is present on a particle aggregate 100 is virtually eliminated. The plurality of porous ceramic particles 10 that constitute the particle aggregate 100 can also be arranged as a layer and dispersed uniformly.

Figure 6A:
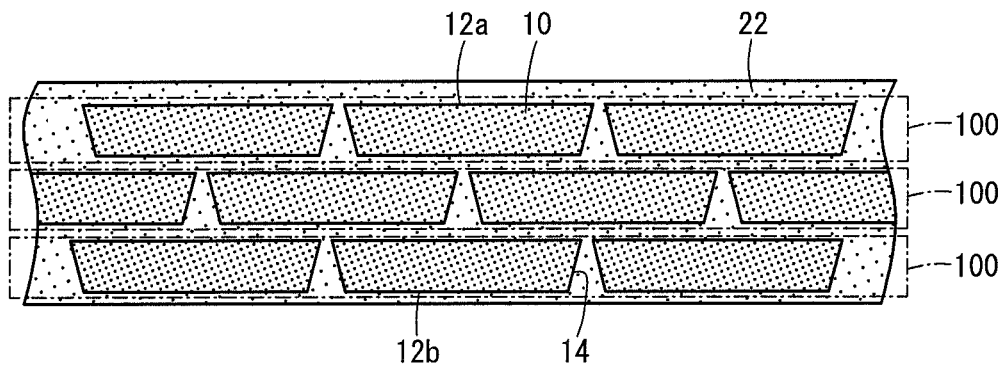
FIG. 6A is a process diagram showing a state in which a plurality of porous ceramic particles (an aggregation of plural particles) and a slurry containing an adhesive component are poured into a non-illustrated mold.
Figure 6B:
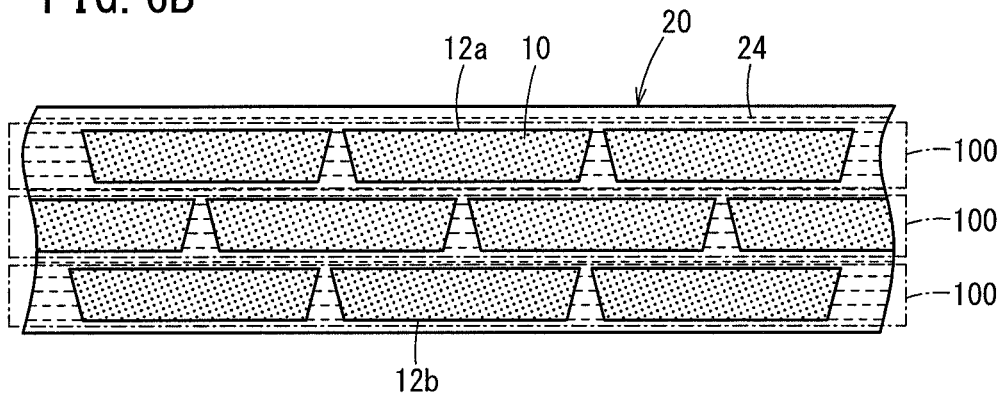
FIG. 6B is a process diagram showing a state in which the slurry is dried, and thereafter fired and solidified to form a bulk body.
Figure 6C:
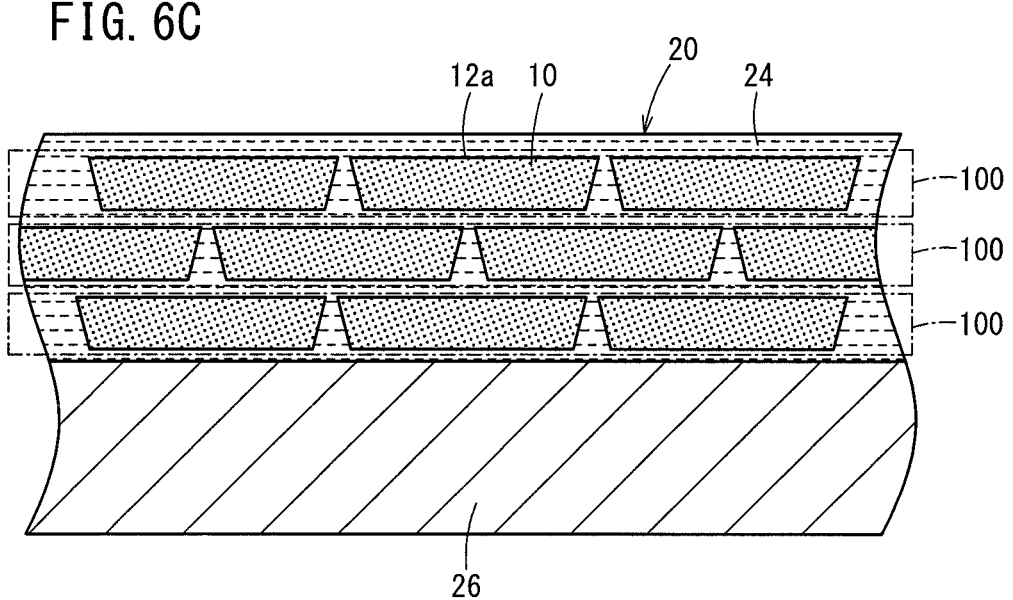
FIG. 6C is a process diagram showing a state in which the bulk body is mounted on an object.

Further, as shown in FIGS. 6A to 6C, in the case that a plurality of porous ceramic particles 10 which are dispersed in a layered manner are aggregated, or in other words, in the case that porous ceramic particle aggregates (hereinafter referred to simply as particle aggregates 100) are arranged in two or more layers, the following operative effects also are exhibited. More specifically, since the one principal surface 12a of each of the porous ceramic particles 10 is a mirror surface, for example, an unevenness in thickness of the slurry 22 that is present on the particle aggregate 100 of the first layer is virtually eliminated. Therefore, the plurality of porous ceramic particles 10 that constitute the second layer particle aggregate 100 that is disposed on the first layer particle aggregate 100 can also be arranged in a layered manner and dispersed uniformly. Such a feature also applies to the particle aggregate 100 of a third layer or more.

Furthermore, since the side surfaces 14 of each of the porous ceramic particles 10 are rough, it becomes difficult for the upper layer slurry 22 to become wrapped around into the layer beneath the porous ceramic particles 10, and similarly, it becomes difficult for the lower layer slurry 22 to become wrapped around into the layer above the porous ceramic particles 10. Owing to this feature, it becomes possible to keep the distance between the particle aggregates 100 substantially constant, and to keep the distance between the porous ceramic particles 10 that make up the particle aggregates 100 substantially constant as well. More specifically, it is possible to regulate the distance (inter-particle distance) between the porous ceramic particles 10 to be 10 μm or less. As a result, it is possible to avoid a phenomenon in which the thickness of the adhesive 24, for example, in the layer underneath the first layer particle aggregate 100 becomes excessively thick. The inter-particle distance is preferably less than or equal to 7 μm, and more preferably, is less than or equal to 4 μm. However, it is not necessarily favorable for the inter-particle distance to be narrow, and it is necessary that the inter-particle distance be greater than or equal to 0.1 μm. If the inter-particle distance is greater than or equal to 0.1 μm, the following effects can be achieved in the case that the bulk body 20 is adhered to the object 26 after the slurry is subsequently made into the form of a film of the bulk body 20. More specifically, in the event that the front surface side of the bulk body 20 becomes high in temperature whereas the bulk body 20 becomes low in temperature on the side of the object 26, thermal expansion occurs in the bulk body 20 itself, however, since the inter-particle distance (gaps) of 0.1 μm or greater is present, thermal stresses which are generated in the porous ceramic particles 10, the adhesive 24, and the object 26 or the like are easily alleviated.

In this manner, in the present embodiment, since the plurality of porous ceramic particles 10 can be uniformly dispersed in the slurry 22, regions composed of only the adhesive 24 having a higher thermal conductivity than that of the porous ceramic particles 10 become narrowed, and the thermal conductivity of the bulk body 20 can be suppressed to remain at a low value. Moreover, the thermal conductivity can be equalized within the bulk bodies 20, there is no need to change or modify the bulk body 20 corresponding to the location where the bulk body 20 is installed, the process of arranging the bulk body 20 can be simplified, and the number of arranging steps can be reduced.

Figure 7:
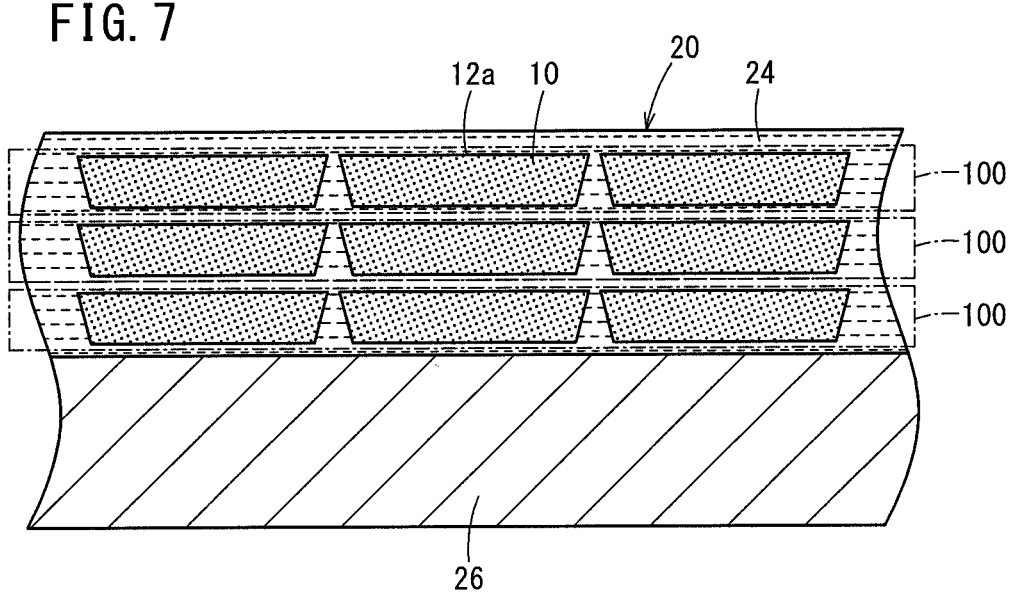
FIG. 7 is a cross-sectional view with partial omission showing an example in which a plurality of porous ceramic particles are vertically aligned in a bulk body.

Moreover, in FIGS. 6A to 6C, an example has been illustrated in which the plurality of porous ceramic particles 10 are arranged in a staggered manner. However, as shown in FIG. 7, the plurality of porous ceramic particles 10 may be aligned in the vertical direction. However, in the example of FIG. 7, since regions containing only the adhesive 24 are joined in the vertical direction, there is a concern that the effect of suppressing thermal conductivity may be lower than in the case of the staggered arrangement.

Figure 8A:
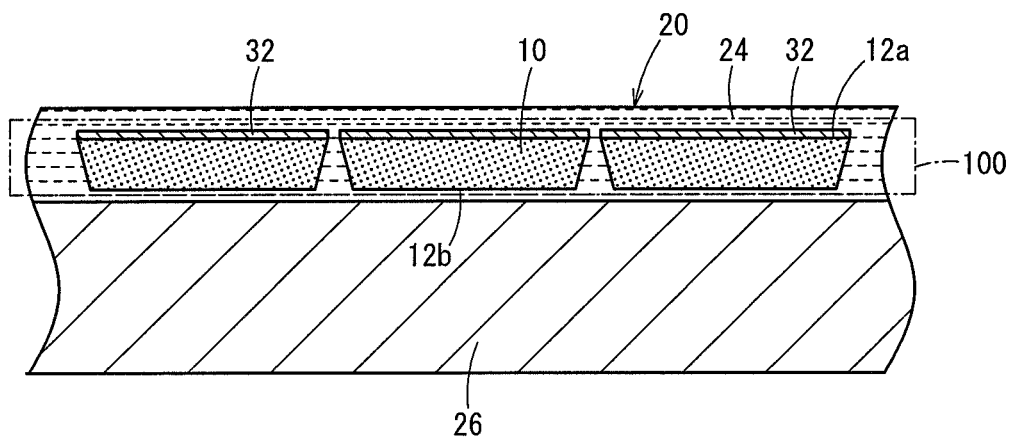
FIG. 8A is a cross-sectional view with partial omission showing one example in which a dense layer is disposed on the porous ceramic particles.
Figure 8B:
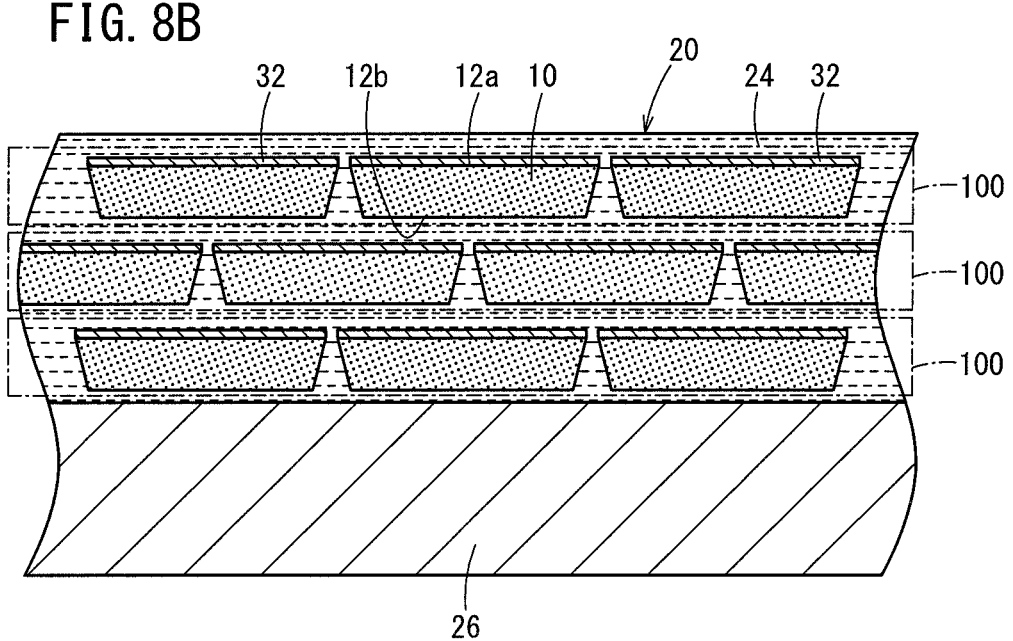
FIG. 8B is a cross-sectional view with partial omission showing another example in which a dense layer is disposed on the porous ceramic particles.

Further, as shown in FIGS. 8A and 8B, a dense layer 32 may be disposed on the one principal surface 12a of each of the porous ceramic particles 10. In accordance with this feature, the strength of the respective porous ceramic particles 10 can be enhanced. Of course, apart from being disposed on the one principal surface 12a of the porous ceramic particle 10, the dense layer 32 may be disposed on the other principal surface 12b (principal surfaces on the side of the object 26) opposite to the one principal surface 12a. Further, dense layers 32 may be disposed on both the one principal surface 12a and the other principal surface 12b of each of the porous ceramic particles 10. When the dense layer 32 is disposed on each of the other principal surfaces 12b of the porous ceramic particles 10, it is possible to inhibit the adhesive 24 from infiltrating into the porous ceramic particles 10, and in addition, to increase the strength of the porous ceramic particles 10. Concerning the arrangement of the dense layers 32 on the porous ceramic particles 10, separately formed dense layers 32 may be disposed on the porous ceramic particles 10, or altered layers (dense layers) may be formed in the porous ceramic particles 10 themselves.

Figure 9A:
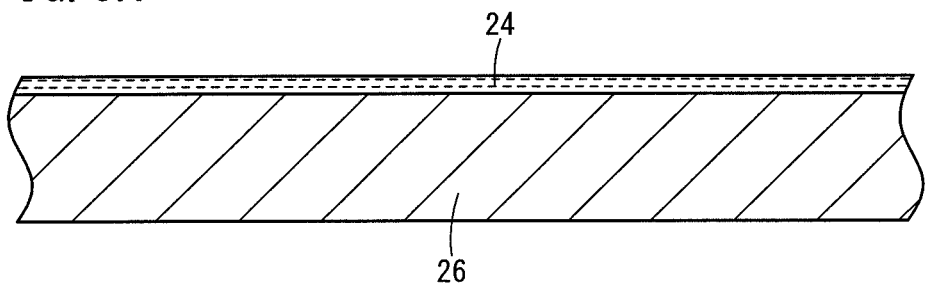
FIG. 9A is a process diagram showing a state in which an adhesive is coated on an object.
Figure 9B:
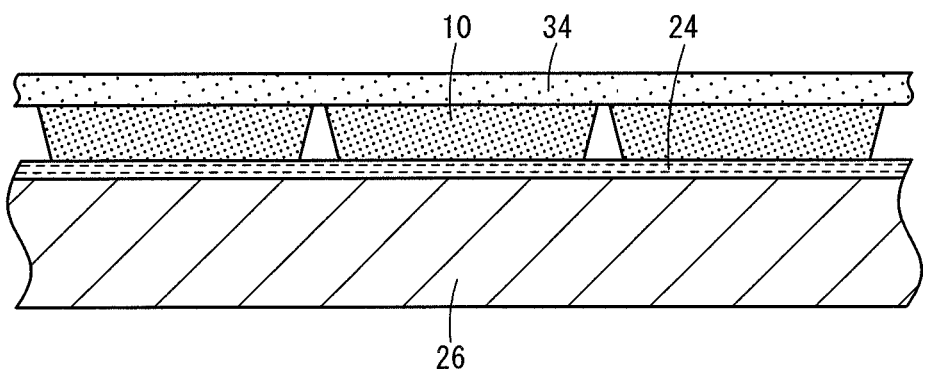
FIG. 9B is a process diagram showing a state in which a plurality of porous ceramic particles are transferred onto the adhesive using a sheet having a plurality of porous ceramic particles attached to one surface thereof.

Next, the second method will be described with reference to FIGS. 9A to 10C. In the second method, as shown in FIG. 9A, first, an adhesive 24 is coated on the object 26. Then, as shown in FIG. 9B, the plurality of porous ceramic particles 10 are transferred onto the adhesive 24 of the object 26, for example, by using a sheet 34 having the plurality of porous ceramic particles 10 adhered to one surface thereof. The inter-particle distance of the plurality of porous ceramic particles 10 that are adhered to the sheet 34 is set to be less than or equal to 10 μm. The inter-particle distance is preferably less than or equal to 7 μm, and more preferably, is less than or equal to 4 μm. Concerning the sheet 34, a sheet or film having an adhesive force, which becomes peelable due to external factors such as heat, electricity, or the like, is preferable.

Figure 9C:
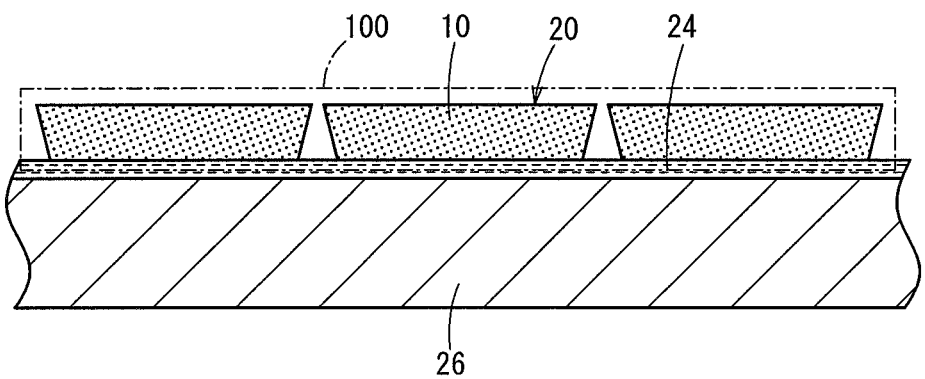
FIG. 9C is a process diagram showing a state in which the sheet is peeled off.

As shown in FIG. 9C, by heating the sheet 34 and peeling off the sheet 34, a bulk body 20 composed of the plurality of porous ceramic particles 10 and the adhesive 24 is installed on the object 26. In other words, the bulk body 20 made up from the adhesive 24 and a particle aggregate 100 in one layer is installed.

Figure 10A:
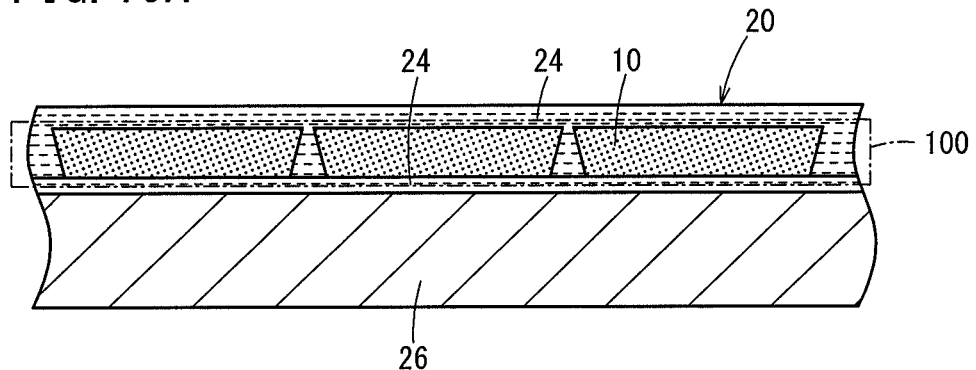
FIG. 10A is a cross-sectional view with partial omission showing an example in which a bulk body is constructed by coating an adhesive on a plurality of porous ceramic particles.

Furthermore, as shown in FIG. 10A, the bulk body 20 may further be constituted by coating the adhesive 24 onto the plurality of porous ceramic particles 10. In this case, since the outer surface of the porous ceramic particles 10 is covered with the adhesive 24, although the structural integrity thereof increases in strength, there is a concern that the thermal conductivity may become higher than in the example of FIG. 9C.

Figure 10B:
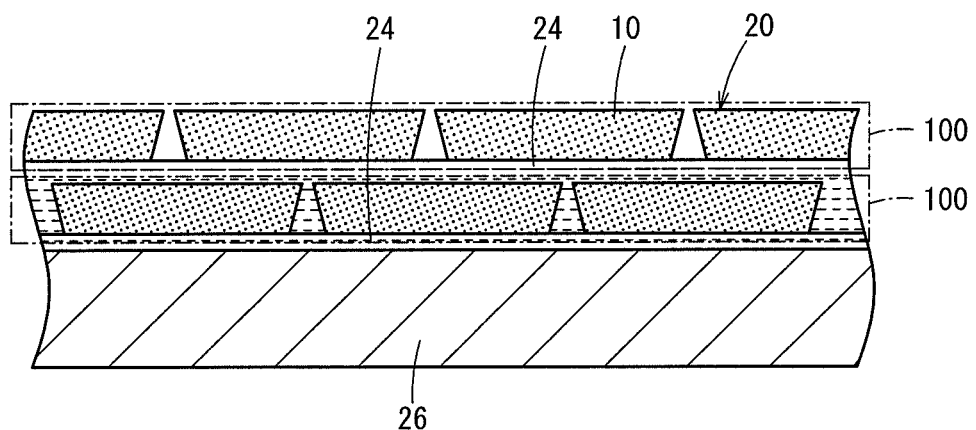
FIG. 10B is a cross-sectional view with partial omission showing an example in which a plurality of porous ceramic particles are further transferred onto an upper layer adhesive from the state shown in FIG. 10A to thereby construct the bulk body.
Figure 10C:
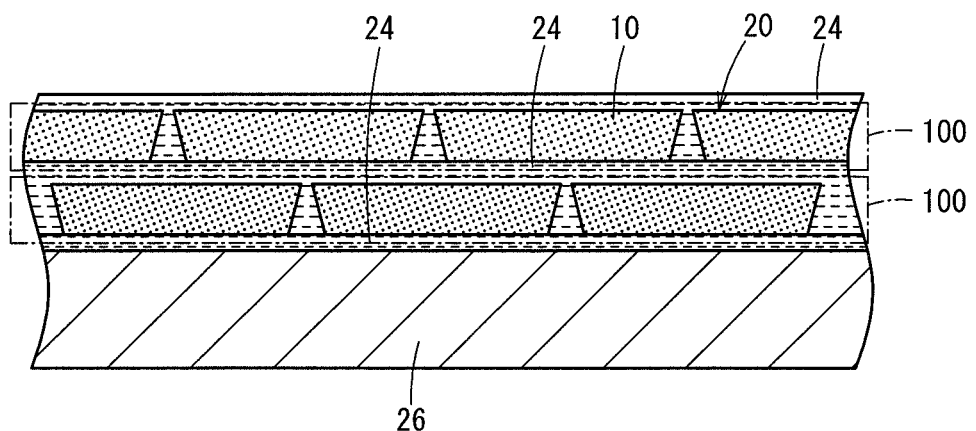
FIG. 10C is a cross-sectional view with partial omission showing an example in which a bulk body is constructed by coating an adhesive onto the plurality of porous ceramic particles from the state shown in FIG. 103.

Further, as shown in FIG. 10B, from the state shown in FIG. 10A, another plurality of porous ceramic particles 10 may further be transferred onto the upper layer adhesive 24 to thereby make up the bulk body 20. In other words, the bulk body 20 made up from the adhesive 24 and particle aggregates 100 in two layers is installed. Further, as shown in FIG. 10O, from the state shown in FIG. 10B, the bulk body 20 may further be constituted by coating the adhesive 24 onto the plurality of porous ceramic particles 10.

Of course, starting from the state shown in FIG. 9C, application of the adhesive 24 onto the plurality of porous ceramic particles 10→ and transfer of another plurality of porous ceramic particles 10 onto the adhesive 24 may be repeated, and a bulk body 20 may be constituted from the adhesive 24 and particle aggregates 100 in three or more layers. Alternatively, starting from the state shown in FIG. 10A, transfer of another plurality of porous ceramic particles 10 onto the adhesive 24→ and application of the adhesive 24 onto the plurality of porous ceramic particles 10 may be repeated, and a bulk body 20 may be constituted from the adhesive 24 and particle aggregates 100 in three or more layers.

In the second method, in the same manner as the first method, the plurality of porous ceramic particles 10 can be uniformly dispersed in the adhesive 24. In addition, since regions composed of only the adhesive 24 having a thermal conductivity higher than that of the porous ceramic particles 10 are narrowed, the thermal conductivity of the bulk body 20 can be suppressed and remain low. In particular, in the second method, unlike the first method, because the plurality of porous ceramic particles 10 are arranged on the object 26 via the adhesive 24 without the bulk body 20 being provided in advance, and the adhesive 24 is coated thereon from above, it is possible for the plurality of porous ceramic particles 10 to be uniformly arranged on the object 26. In addition, it becomes easy to install the bulk body 20 in a partial region of the object 26, or to install the bulk body 20 along a complex shape, thereby enhancing the degree of freedom in design. Further, because the sheet 34 is used on which the plurality of porous ceramic particles 10 are attached on one surface thereof, the operation of arranging the plurality of porous ceramic particles 10 on the adhesive 24 is facilitated, and the manufacturing process can be simplified.

Preferably, the adhesive strength (JIS 20237) of the sheet 34 is greater than or equal to 1.0 N/10 mm, the tensile elongation (JIS K7127) of the sheet 34 is greater than or equal to 0.5%, and the thickness of the sheet 34 is less than or equal to 5 mm. Consequently, the following effects can be obtained.

(a) The higher the adhesive strength, the more firmly the porous ceramic particles 10 can be fixed.

(b) As the tensile elongation increases, it is possible to follow along the curved surface.

(c) As the thickness thereof is thinner, it becomes easier to follow along the curved surface.

In greater detail, the adhesive strength of the sheet 34 exhibits the following properties. More specifically, the adhesive strength at the time that the porous ceramic particles 10 are retained is greater than or equal to 1.0 N/10 mm, and the adhesive strength at the time of peeling the porous ceramic particles 10 is less than or equal to 0.1 N/10 mm.

The method of evaluating the adhesive strength of the sheet 34 is the same as the method used for evaluating the adhesive strength of an adhesive tape. In particular, the sheet 34 is attached to a stainless steel plate, and the sheet 34 is pulled at an angle of 180° or 90°, whereupon the force applied when peeling the sheet 34 off from the stainless steel plate is regarded as the adhesive force.

Further, the sheet 34 is formed by applying an adhesive to a base material (support). In this case, as the type of base material, preferably a material is selected from among the following.

More specifically, when the porous ceramic particles 10 are transferred onto a planar object 26, it is preferable to use a film, metal foil, paper, or the like as the base material. Since the base material of the sheet 34 is stiff, it is possible to deposit the sheet 34 in the form of a film without wrinkles with respect to the planar object 26.

In the case of transferring the porous ceramic particles 10 onto an object 26 having a curved surface (convex surface, concave surface, convex and concave (irregular) surface) shape, it is preferable to use a cloth, a rubber sheet, foam or the like as the base material. In this case, since the base material of the sheet 34 is soft and stretchable, it is possible to form the sheet 34 in following relation to the curved surface shape.

Further, by application of heat, water, a solvent, light (ultraviolet light), or microwaves, the adhesive strength of the sheet 34 can be weakened and the sheet 34 can be easily peeled off. At this time, the adhesive strength of the sheet 34 is preferably weaker than the adhesive strength of the adhesive 24 that is used between the object 26 and the porous ceramic particles 10.

EXAMPLES

A confirmation was carried out concerning the thermal conductivity of each of the bulk bodies 20, for cases in which the respective bulk bodies 20 were constituted using the porous ceramic particles according to Examples 1 through 6 and Comparative Examples 1 and 2. In the Examples, the porous ceramic particles 10 shown in FIGS. 1A to 1C were used.

Example 1

Porous ceramic particles each having a porosity of 60% and a minimum length of 50 μm, and an aspect ratio of 10 were used as the porous ceramic particles 10, and a bulk body 20 according to Example 1 was produced according to the above-described first manufacturing method. More specifically, a slurry containing the porous ceramic particles, water, and an adhesive component (having a thermal conductivity of 2 W/mK) was prepared and poured into a mold having a diameter of 20 mm. After drying, the slurry was fired and solidified to thereby produce the bulk body 20 according to Example 1.

<Production of Porous Ceramic Particles>

In Example 1, porous ceramic particles 10 were prepared in the following manner. More specifically, a pore forming agent (latex particles or melamine resin particles), a polyvinyl butyral resin (PVB) as a binder, DOP (dioctyl phthalate) as a plasticizer, and xylene and 1-butanol as solvents were added to yttria-partially-stabilized zirconia powder, and mixed in a ball mill for 30 hours in order to prepare a green sheet casting slurry. The slurry was subjected to a vacuum defoaming treatment, whereby the viscosity thereof was adjusted to 4000 cps, and thereafter, the cast body (green sheet) was produced by the doctor blade device such that the thickness thereof after firing was of a minimum length. Thereafter, the cast body was fired at 1100° C. for one hour and machined by a laser, whereby the porous ceramic particles 10 were obtained. Further, the one principal surface 12a of each of the porous ceramic particles 10 was mirror finished to have a surface roughness Ra of 1.0 μm.

Example 2

Porous ceramic particles each having a porosity of 60%, a minimum length of 100 μm, and an aspect ratio of 8 were used as the porous ceramic particles 10, and otherwise, a bulk body 20 according to Example 2 was produced in the same manner as Example 1.

Example 3

Porous ceramic particles each having a porosity of 60%, a minimum length of 400 μm, and an aspect ratio of 3 were used as the porous ceramic particles 10, and otherwise, a bulk body 20 according to Example 3 was produced in the same manner as Example 1.

Example 4

Porous ceramic particles each having a porosity of 30%, a minimum length of 400 μm, and an aspect ratio of 3 were used as the porous ceramic particles 10, and otherwise, a bulk body 20 according to Example 4 was produced in the same manner as Example 1.

Example 5

Porous ceramic particles each having a porosity of 60%, a minimum length of 50 μm, and an aspect ratio of 10 were used as the porous ceramic particles 10, and a bulk body 20 according to Example 5 was produced according to the above-described second manufacturing method. More specifically, a sheet 34 was used having a plurality of porous ceramic particles 10 attached to one surface thereof. In addition, after coating the adhesive 24 (thermal conductivity 2 W/mK) onto the object 26, the plurality of porous ceramic particles 10 were transferred onto the adhesive 24 of the object 26 using the aforementioned sheet 34, and by application of heat thereto, the sheet 34 was peeled off. After having coated the adhesive 24 thereon from above, the adhesive 24 was solidified. Thereafter, transfer of the porous ceramic particles 10 by the sheet 34, coating of the adhesive 24, and solidification thereof were repeated to thicken the portion forming the bulk body 20, after which, by being peeled off from the object 26, the bulk body 20 was produced. In this instance, peeling off of the bulk body 20 from the object 26 was done in order to measure and evaluate the thermal conductivity of the bulk body 20.

Example 6

Porous ceramic particles each having a porosity of 60%, a minimum length of 100 μm, and an aspect ratio of 8 were used as the porous ceramic particles 10, and otherwise, a bulk body 20 according to Example 6 was produced in the same manner as Example 5.

Comparative Example 1

Porous ceramic particles each having a porosity of 70%, a minimum length of 0.2 μm, and an aspect ratio of 2 were used as the porous ceramic particles 10, and otherwise, a bulk body 20 according to Comparative Example 1 was prepared in the same manner as Example 1.

Comparative Example 2

Porous ceramic particles each having a porosity of 60%, a minimum length of 10 μm, and an aspect ratio of 5 were used as the porous ceramic particles 10, and otherwise, a bulk body 20 according to Comparative Example 2 was prepared in the same manner as Example 1.

<Measurement of Porosity>

Ten porous ceramic particles 10 were selected at random and embedded in a resin. The resin was polished to create an observation site where composite particles could be observed with an electron microscope, to thereby obtain a resin-filled polished surface. Then, an electron microscopic observation (image analysis) was performed on the resin-filled polished surface. From such an image analysis, the porosities of the ten porous ceramic particles 10 were calculated, and the average value of the ten porous ceramic particles 10 was taken as the porosity thereof.

<Measurement of Average Pore Diameter>

The average pore diameter of the porous ceramic particles 10 was measured using an automated porosimeter (trade name "Autopore 9200") by Shimadzu Corporation.

<Method of Measuring Thermal Conductivity of Bulk Body and Evaluation Criteria Thereof>

At first, the density of the bulk body was measured with a mercury porosimeter. Next, the specific heat of the bulk body 20 was measured using a DSC (Differential Scanning calorimeter) method. Next, the thermal diffusivity of the bulk body 20 was measured using a laser flash method. Thereafter, the thermal conductivity of the bulk body 20 was calculated from the following relational expression:

Thermal Diffusivity×Specific Heat×Density=Thermal Conductivity

Then, based on the following evaluation criteria, the thermal conductivities of Examples 1 to 6 and Comparative Examples 1 and 2 were evaluated.

A: Less than or equal to 0.9 W/mK
B: Greater than or equal to 1.0 W/mK and less than or equal to 1.4 W/mK
C: Greater than or equal to 1.5 W/mK <Evaluation Results>

A breakdown and evaluation results of Examples 1 to 6, and Comparative Examples 1 and 2 are shown below in Table 1.

TABLE 1

|  | Porous Ceramic Particles | | | Bulk Body | |
| --- | --- | --- | --- | --- | --- |
|  | Porosity (%) | Minimum Length (μm) | Aspect Ratio | Thermal Conductivity (W/mK) | Evaluation |
| Example 1 | 60 | 50 | 10 | 0.8 | A |
| Example 2 | 60 | 100 | 8 | 0.4 | A |
| Example 3 | 60 | 400 | 3 | 0.3 | A |
| Example 4 | 30 | 400 | 3 | 1.0 | B |
| Example 5 | 60 | 50 | 10 | 0.6 | A |
| Example 6 | 60 | 100 | 8 | 0.3 | A |
| Comparative Example 1 | 70 | 0.2 | 2 | 1.8 | C |
| Comparative Example 2 | 60 | 10 | 5 | 1.6 | C |

As can be understood from Table 1, in Comparative Examples 1 and 2, the thermal conductivities were high values of 1.8 W/mK and 1.6 W/mK. In the bulk bodies 20 according to Comparative Examples 1 and 2, it is considered that the thermal conductivity became high because there were many regions in which only the adhesive 24 was present.

On the other hand, among Examples 1 to 6, with the exception of example 4, the thermal conductivities of the bulk bodies 20 were all less than or equal to 0.9 W/mK, and the evaluation therefor was A. Concerning Example 4 as well, although the evaluation was B, the thermal conductivity was 1.0 W/mK, which was exceedingly close to the evaluation result of A. In Examples 1 and 5, although both had the same aspect ratio of 10, Example 5 in accordance with the second method exhibited a lower thermal conductivity. The same feature also applies to Examples 2 and 6.

This is considered to be due to the fact that, in Examples 1 to 6, as compared with Comparative Examples 1 and 2, since the plurality of porous ceramic particles 10 were uniformly dispersed in the adhesive 24, and the regions 30 composed of only the adhesive 24 having a high thermal conductivity were narrowed, the thermal conductivity of the bulk body 20 could be suppressed to remain at a low value. This advantageous effect was particularly remarkable in the case of Examples 5 and 6 in which the second method was adopted.

The porous ceramic particles according to the present invention are not limited to the above-described embodiments, and it is a matter of course that various configurations could be adopted therein without departing from the gist of the present invention.

What is claimed is:

1. A porous ceramic particle having a porosity of 20% to 99%, wherein one principal surface of the porous ceramic particle is a mirror surface, another principal surface of the porous ceramic particle is also a mirror surface that faces toward the one principal surface, and an aspect ratio thereof is greater than or equal to 3, and wherein the porous ceramic particle includes a plurality of side surfaces, and the side surfaces are rough surfaces.

2. The porous ceramic particle according to claim 1, wherein the aspect ratio is a maximum length La divided by a minimum length Lb, where the maximum length La is a maximum length on a wider surface of either the one principal surface or the other principal surface, and the minimum length Lb is a thickness of the porous ceramic particle.

3. The porous ceramic particle according to claim 1, wherein a minimum length of an outer shape of the porous ceramic particle is 50 to 500 μm.

4. The porous ceramic particle according to claim 1, wherein an average pore diameter of the porous ceramic particle is less than or equal to 500 nm.

5. The porous ceramic particle according to claim 1, wherein a thermal conductivity of the porous ceramic particle is less than or equal to 1 W/mK.

6. The porous ceramic particle according to claim 1, wherein the porous ceramic particle has a structure in which fine grains are connected in three dimensions, and a grain diameter of the fine grains is 1 nm to 5 μm.

7. The porous ceramic particle according to claim 1, wherein an interparticle distance is less than or equal to 10 μm.

8. The porous ceramic particle according to claim 7, wherein the inter-particle distance is less than or equal to 7 μm.

9. The porous ceramic particle according to claim 7, wherein the inter-particle distance is less than or equal to 4 μm.

10. The porous ceramic particle according to claim 7, wherein the inter-particle distance is greater than or equal to 0.1 μm.

11. The porous ceramic particle according to claim 1, wherein the porous ceramic particle is disposed on a sheet.

12. The porous ceramic particle according to claim 1, wherein a surface roughness of the one principal surface is less than or equal to 1 μm.

13. The porous ceramic particle according to claim 1, wherein the one principal surface has a surface roughness smaller than that of another principal surface that faces toward the one principal surface.

14. The porous ceramic particle according to claim 1, wherein a surface roughness of the one principal surface is less than 90% of a surface roughness of the another principal surface.

15. The porous ceramic particle according to claim 1, wherein each of the rough surfaces has a surface roughness that is greater than 1 μm.

16. The porous ceramic particle according to claim 1, wherein a surface roughness of each of the side surfaces is equal to or greater than 5 μm and equal to or lower than 10 μm.

* * * * *